United States Patent [19]
Holzgrafe

[11] Patent Number: 4,459,614
[45] Date of Patent: Jul. 10, 1984

[54] ROTATION-FREE ELECTRICAL FOCUSSING CIRCUIT FOR TELEVISION IMAGE TUBES

[75] Inventor: James R. Holzgrafe, Sunnyvale, Calif.

[73] Assignee: Ampex Corporation, Redwood City, Calif.

[21] Appl. No.: 334,348

[22] Filed: Dec. 24, 1981

[51] Int. Cl.³ .............................................. H04N 5/34
[52] U.S. Cl. .................................. 358/222; 358/227; 358/218; 315/370; 315/386
[58] Field of Search .............. 358/227, 222, 218, 219, 358/216, 163; 315/370, 382, 386, 379, 31 R, 31 TV

[56] References Cited

U.S. PATENT DOCUMENTS

| | | | |
|---|---|---|---|
| 2,901,661 | 8/1959 | Neuhauser | 358/218 |
| 3,647,952 | 3/1972 | Ball | 358/218 |
| 3,710,018 | 1/1973 | Ryley | 358/218 |

*Primary Examiner*—Tommy P. Chin
*Attorney, Agent, or Firm*—George B. Almeida; Joel D. Talcott

[57] ABSTRACT

Vertical-rate and horizontal-rate sawtooth generators are coupled at a common input to a conventional focus control voltage and then to the centering circuits of an image tube via respective potentiometers. The amplitudes and polarities of the generator outputs are selected such that when driven simultaneously by the electrical focus control voltage supplied to an image tube, generates an image rotation which just cancels any image rotational error inherently induced by an electrical focus adjustment.

10 Claims, 4 Drawing Figures

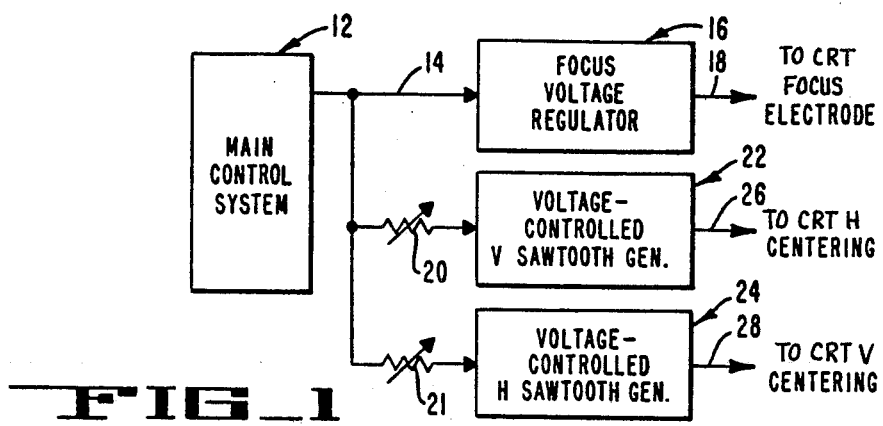
FIG_1
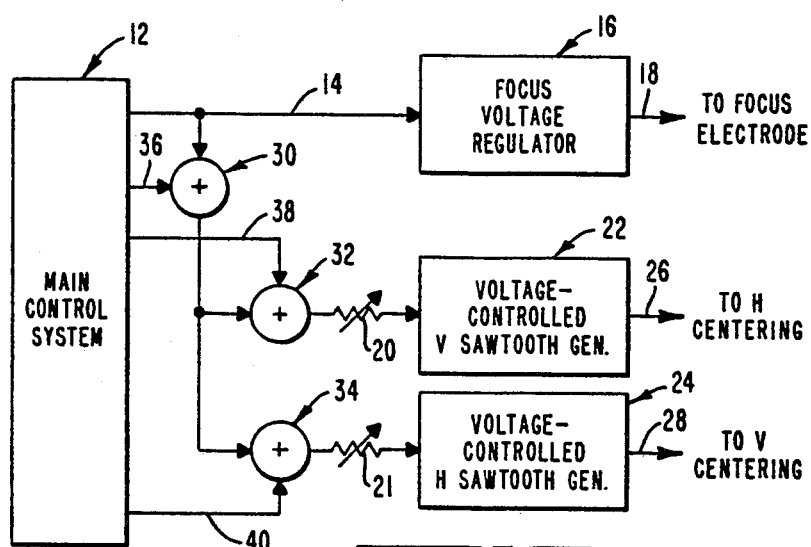
FIG_2
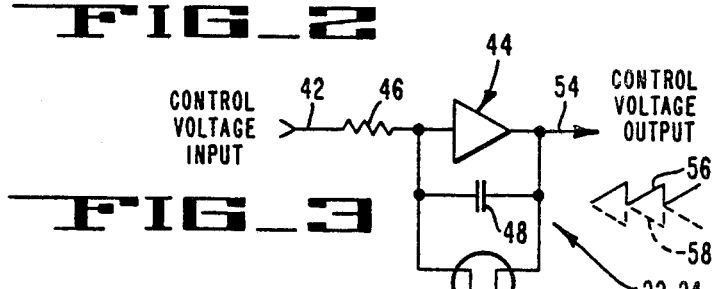
FIG_3
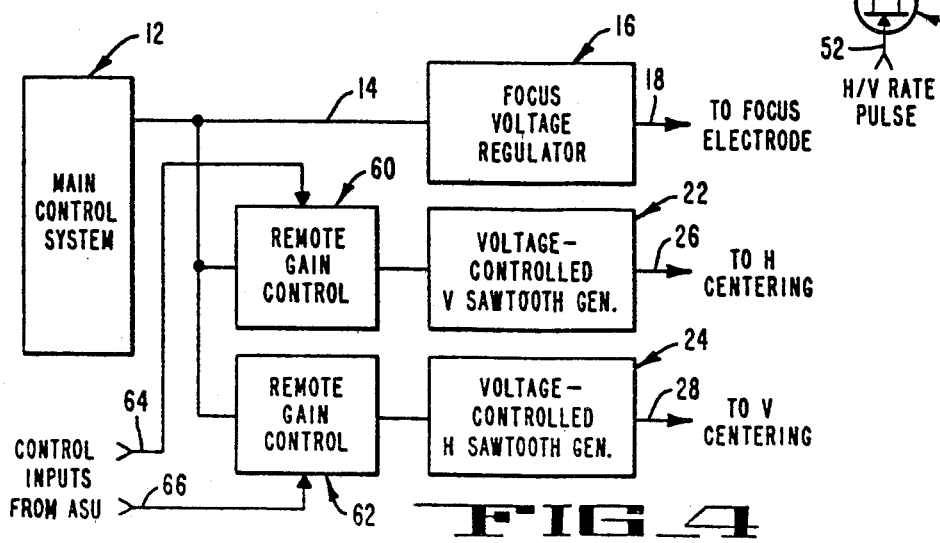
FIG_4

ROTATION-FREE ELECTRICAL FOCUSSING CIRCUIT FOR TELEVISION IMAGE TUBES

CROSS REFERENCE TO RELATED APPLICATIONS

K. H. Griesshaber, Ser. No. 139,604, filed Apr. 11, 1980, now U.S. Pat. No. 4,326,219, entitled "Digital Error Measuring Circuit For Shading and Registration Errors in Television Cameras," assigned to the same assignee as the present application.

BACKGROUND AND SUMMARY OF THE INVENTION

The invention relates to improvements in television cameras, and particularly to a circuit for automatically preventing raster rotation in image tubes due to adjustments of the electrical focus.

In the field of television cameras, vidicon type image tubes such as those used for pick-up tubes in television cameras have an inherent problem known in the art as "image rotation", caused by the adjustment of the electron beam focussing fields. The problem arises due to electron beam rotation within the tube; i.e., the fact that the beam proceeds from the cathode to the target of the tube in a spiral path, whereby changes in the electrical focus of the beam causes the scanned raster to rotate its position on the target. This in turn causes image rotation on the displayed picture. Moreover, the sensitivity of the rotation, i.e., the resulting image rotational error induced, is large compared to the degree of focus adjustment made. Thus, a totally unacceptable rotational error can result from an imperceptible change in electrical focus.

It follows that any change in focus control voltage, whether intentional or unintentional, greatly aggravates the problem of establishing camera spatial registration, particularly in a color camera. Therefore, if it is necessary to re-focus a tube in a color camera, it is almost imperative that a complete re-registration of the camera tube be made to correct for the image rotation on the target. Thus the interaction between focus setting and registration, etc., becomes rather complex.

The classic method of correcting image rotation due to electrical focussing is by direct mechanical rotation of the deflection yoke. This method is obviously cumbersome and time consuming, since the error is induced by adjustments made from a remotely located point, while the correction must be made locally at the camera head. The method is further complicated by the usual absence of adequate monitoring equipment at the camera head.

Single axis skew is generally utilized in color cameras to correct the lack of orthogonality which is generally inherent in most camera tube deflection systems. That is, one axis skew is used to correct the condition where the horizontal axis may not be at right angles to the vertical axis, or vice versa. The skew correction is utilized to make one axis orthogonal to the other axis prior to performing any registration, etc., corrections during tube operation.

Thus it follows that the more sophisticated camera systems such as those incorporating automatic control of registration, shading, etc., incorporate the individually adjustable electrical skew controls, which thus enable independent rotation of the vertical and horizontal scanning axes. Thus, after having focussed the tube, individual horizontal and vertical skew control adjustments may be made to correct the image rotation caused by the focussing procedure.

Although the latter system for correcting image rotation by means of independent axis skew adjustments is a significant improvement over the mechanical procedure for correcting same, it still generally requires two individual compensating adjustments to be made every time the electrical focus is changed.

The present invention simultaneously generates the required electrical rotational correction for both axes, directly from the electrical focus control voltage that induces the rotational error caused by adjusting the focus. The proportion of electrical rotational correction provided is selected to just cancel the raster rotational error induced by the focussing procedure. The net result is that the electrical rotational adjustment is accomplished automatically in response to the electrical focus control voltage to circumvent any resulting image rotation due to the focus adjustment.

To this end, vertical-rate and horizontal-rate sawtooth generators, whose output amplitudes and polarities are controllable by a single DC input control voltage, are coupled to an electrical focus control voltage source via suitable potentiometers at a common input. The amplitude and polarity sensitivities of the generators are selected such that when driven simultaneously by the single input control voltage which adjusts the electrical focus, their respective outputs are such that the horizontal and the vertical scan centering systems coupled thereto cancel the image rotational error induced by the electrical focus adjustment. Thus, electrical focussing may be performed without attendant image rotation.

Accordingly, it is an object of the present invention to automatically correct image rotation induced by a change of focus, in response to the electrical focus control voltage which induced the rotational error.

Another object is to generate the required electrical rotational correction simultaneously for both axes directly from the electrical focus control voltage.

A further object is to generate an image rotation correction which just cancels the rotational error induced by a change in the electrical focus control voltage, whereby an electrical focus adjustment is accomplished without the usual image rotation.

BRIEF DESCRIPTION OF THE DRAWINGS

FIG. 1 is a block diagram depicting the combination of the invention.

FIG. 2 is an alternative embodiment of the block diagram in FIG. 1.

FIG. 3 is a schematic diagram of the invention combination as used in the block diagram of FIGS. 1, 2.

FIG. 4 is another alternative embodiment of the block diagram of FIG. 1.

DESCRIPTION OF THE PREFERRED EMBODIMENTS

FIG. 1 is a block diagram of the invention combination wherein a main control system 12 corresponding, for example, to the central control unit of a television camera system, supplies inter alia an electrical focus control voltage conventionally used to adjust the electrical focus of an image tube, or tubes (not shown) in the camera. The focus control voltage is supplied via line 14 to a focus voltage regulator circuit 16 located in each channel of the image tube. The regulator circuit is coupled via a line 18 to a focus electrode of the tube.

In accordance with the invention combination, potentiometers 20 and 21 are coupled at a common input to the focus control voltage line 14 and thence to vertical and horizontal sawtooth generators 22, 24 respectively. The output of vertical sawtooth generator 22 is coupled via a line 26 to a horizontal centering circuit (not shown) associated with the tube, while the output of the horizontal sawtooth generator 24 is coupled via a line 28 to a vertical centering circuit associated with the tube. Thus a vertical sawtooth waveform is coupled to the horizontal centering circuit, while a horizontal sawtooth waveform is coupled to the vertical centering circuit, of the tube. To simplify the description, the vertical and horizontal sawtooth generators 22, 24 are hereinafter termed "skew" generators 22, 24.

Accordingly, by way of example, if there is image rotation in either direction, e.g., there is image rotational error in the clockwise direction, vertical and horizontal sawtooths are supplied to the horizontal and vertical centering circuitry respectively, whereby as the electron beam scans down the target, the rotational error is reduced in proportion to the sawtooth components supplied. Thus, in effect, the image is rotated in the opposite direction to compensate for what would have been rotational error. As previously mentioned image rotation is the result of raster rotation.

As shown in FIG. 1, both the horizontal and vertical skew generators 22, 24 are coupled together at their inputs and thence to the focus control voltage line 14 via respective potentiometers 20, 21, whereby both skew generators are driven by a single control voltage. This provides image rotation rather than individual axis skew control. It follows that any change in focus control voltage is automatically fed to the vertical and horizontal skew generators 22, 24 to effect an opposite rotation of the image to counteract any rotation thereof due to the adjustment of the focus control. The magnitudes of the vertical and horizontal sawtooths fed to the horizontal and vertical centering circuits are selected via the potentiometers 20, 21 during the setup mode, such that the generators thereafter supply a rotation which is exactly equal and opposite to the amount of rotation induced by the focus adjustment. This automatically prevents any rotation of the picture during focus adjustment.

Thus by way of example only, the system of FIG. 1 may be set up during the camera setup mode of operation by displaying, for instance, horizontal and vertical lines on the usual camera video monitor (not shown). The focus control voltage, and thus the focus, is varied over its entire range. Simultaneously potentiometers 20, 21 are individually adjusted to just cancel the respective component of rotation of the horizontal and vertical lines, which was caused by the change in focus control voltage. The system is now calibrated and automatically corrects for any subsequent image rotation caused by focus adjustments.

FIG. 2 depicts the invention combination employing vertical and horizontal sawtooth skew generators, herein depicted as the skew generators 22, 24 of FIG. 1. Similar components are similarly numbered in FIGS. 1 and 2. Thus, the focus control voltage line 14 is coupled to a summing junction 30 and thence via respective summing junctions 32, 34 to the vertical and horizontal skew generators 22, 24 respectively via the potentiometers 20, 21. With such an arrangement, the main control system 12 also provides a direct rotational control voltage on a line 36 which is coupled to the generators 22, 24 via the summing junction 30.

In addition, the main control system 12 provides the conventional horizontal and vertical skew control voltages via lines 38, 40 respectively, coupled to the vertical and horizontal generators 22, 24 via the summing junctions 32, 34 respectively. Thus the embodiment of FIG. 2 allows the use of conventional individual skew correction controls, while also utilizing the basic skew circuitry to provide automatic image rotational control via the combination of the potentiometers 20, 21 and the summing junctions 30, 32, 34, with the generators 22, 24. The overall effect is to provide opposite and equal image rotation in response to any adjustment of the electrical focus control voltage on line 14, as well as separate, direct control of horizontal and vertical skew and image rotation.

FIG. 3 depicts by way of example only, a sawtooth generator circuit such as may be utilized in FIGS. 1 and 2. To this end, an input line 42 supplies a control voltage, i.e., the focus control voltage of line 14 of the previous figures, to an operational amplifier 44. The latter amplifier is coupled as an integrator circuit, and includes an input resistor 46 and an integrating capacitor 48 coupled thereacross. The operational amplifier output ramps up or down at a rate determined by the input voltage on line 42, the resistance of the resistor 46, and the capacitance of the capacitor 48. Switch means 50 such as, for example, a switching transistor or field effect transistor (FET), is coupled across the capacitor 48. The switch means periodically shorts out the capacitor to drop the circuit output to ground, wherein the time period is determined by a horizontal or vertical rate pulse on a switch control line 52.

Acccordingly, if a negative control voltage is supplied on input line 42, the control voltage on an output line 54 ramps up as shown at 56, until the capacitor 48 is shorted to ground via the switch means 50. If a positive control voltage is supplied at input 42, the output ramps down as shown in phantom line at 58, until the capacitor 48 is shorted to ground via the switch 50. The magnitude of the control voltage at input 42 corresponds, for example, to the focus control voltage on line 14 of FIGS. 1 and 2, as adjusted by the setting of the potentiometers 20, 21, etc.

Although the skew generator of FIG. 3 is shown in a generally basic form, the circuitry thereof may be modified as known by those skilled in the art to provide a more sophisticated circuit of further precision if so desired.

FIG. 4 depicts a further embodiment of the invention combination, wherein calibration of the system also is performed automatically, rather than by an operator via the potentiometers 20, 21. Like components in the figures again are similarly numbered. To this end, the potentiometers 20, 21 are replaced by remotely actuated, gain control circuits 60, 62 respectively. The latter regulate the voltages supplied to the generators 22, 24 in response to the control voltages on the control lines 64, 66. The control voltages in turn are derived, for example, from an automatic setup unit (ASU) (not shown) such as that described in the copending application Ser. No. 139,604, now U.S. Pat. No. 4,326,219 of previous mention, and comprise signals indicative of the degree of rotational error. More particularly, the control signals may comprise digital commands which set the amplitude and polarity sensitivities of the skew generators to those values which the automatic setup unit determines to be optimum.

What is claimed is:

1. A circuit for precluding image rotational error in an image tube caused by a commensurate variation in focus control voltage applied to the image tube via focus voltage regulator means, comprising;

means coupled to the focus voltage regulator means for generating the focus control voltage including the commensurate variation thereof; and means coupled to said image tube and responsive to the focus control voltage for supplying image rotation which is equal in amplitude and opposite in rotational direction to the image rotational error caused by the commensurate variation in the focus control voltage.

2. The circuit of claim 1 wherein the means for supplying include;

sawtooth generator means coupled to the means for generating, for supplying a selected ramp voltage corresponding to a given image skew about a respective axis.

3. The circuit of claim 2 wherein the sawtooth generator means include;

vertical and horizontal sawtooth generators coupled to the means for generating, for supplying respective ramp voltages in response to the focus control voltage.

4. The circuit of claim 3 further including vertical-rate and horizontal-rate pulse sources coupled to the vertical and horizontal sawtooth generators respectively.

5. The circuit of claim 4 wherein the means for supplying further include;

calibration means coupled at the inputs to the generator means for adjusting the voltage fed thereto in proportion to the degree of horizontal and vertical skews respectively in the image.

6. The circuit of claim 5 wherein the calibrating means include;

potentiometer means coupled between the means for generating the focus control voltage and the sawtooth generator means.

7. The circuit of claim 6 wherein the potentiometer means include a potentiometer inserted at each input to the respective vertical and horizontal sawtooth generators.

8. The circuit of claim 5 wherein the calibrating means include;

gain control means coupled between the means for generating the focus control voltage and the sawtooth generator means; and a gain control source coupled to the gain control means for varying the gain thereof in response to variations in the focus control voltage.

9. A circuit for precluding image rotational error in an image tube caused by a commensurate variation in focus control voltage applied to the image tube in response to a desired change in focus said image tube including horizontal and vertical centering means, comprising:

means coupled to said image tube for generating the focus control voltage including the commensurate variation thereof;

calibration means coupled to the means for generating, for providing a calibrated focus control voltage commensurate with the image rotational error; and sawtooth generator means coupled from the calibration means to the horizontal and vertical centering means for supplying selected ramp voltages to the latter means in response to the calibrated focus control voltage.

10. The circuit of claim 9 wherein:

said calibration means comprises a pair of calibrating circuits coupled at a common input to the means for generating; and said sawtooth generator means comprises vertical and horizontal sawtooth generators coupled to respective calibrating circuits and responsive to the calibrated focus control voltage.

* * * * *